United States Patent
Eom et al.

(10) Patent No.: US 10,975,808 B2
(45) Date of Patent: Apr. 13, 2021

(54) FUEL VAPOR GAS PURGE SYSTEM

(71) Applicants: Hyundai Motor Company, Seoul (KR); Kia Motors Corporation, Seoul (KR)

(72) Inventors: Tae Kwang Eom, Gyeonggi-do (KR); Soo Hong Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/404,358

(22) Filed: May 6, 2019

(65) Prior Publication Data

US 2020/0141362 A1    May 7, 2020

(30) Foreign Application Priority Data

Nov. 5, 2018 (KR) .................. 10-2018-0134098

(51) Int. Cl.
*F02M 25/08* (2006.01)
*F02D 41/00* (2006.01)

(52) U.S. Cl.
CPC ....... *F02M 25/0836* (2013.01); *F02D 41/004* (2013.01); *F02D 41/0045* (2013.01); *F02M 25/0872* (2013.01); *F02M 2025/0845* (2013.01)

(58) Field of Classification Search
CPC .......... F02M 25/0836; F02M 25/0872; F02M 2025/0845; F02D 41/0032; F02D 2200/703; F02D 41/0007; F02D 41/0045; F02D 41/004; F02B 39/10; F02B 37/04
See application file for complete search history.

(56) References Cited

U.S. PATENT DOCUMENTS

| 6,196,202 | B1* | 3/2001 | Busato | F02M 25/089 123/198 D |
| 6,880,534 | B2* | 4/2005 | Yoshiki | F02D 41/0045 123/520 |
| 9,133,796 | B2* | 9/2015 | Plymale | F02M 25/0836 |
| 10,060,394 | B2* | 8/2018 | Guidi | F02M 25/089 |
| 2016/0061164 | A1* | 3/2016 | Fletcher | B60T 17/02 123/568.11 |
| 2016/0201615 | A1* | 7/2016 | Pursifull | F02M 25/089 123/520 |
| 2017/0276078 | A1* | 9/2017 | Imaizumi | F02D 41/0007 |
| 2017/0314512 | A1* | 11/2017 | Dudar | F02D 41/0032 |
| 2018/0187633 | A1* | 7/2018 | Lee | F02M 25/089 |

* cited by examiner

*Primary Examiner* — Hung Q Nguyen
*Assistant Examiner* — Susan E Scharpf
(74) *Attorney, Agent, or Firm* — Mintz Levin Cohn Ferris Glovsky and Popeo, P.C.; Peter F. Corless

(57) ABSTRACT

A fuel vapor gas purge system is provided. The system includes an ejector having an inlet pipe for intake of intake gas, an ejection pipe for ejection of the intake gas and vapor gas, and a suction pipe for suctioning the vapor gas. A first purge line is connected between the suction pipe of the ejector and a vapor gas outlet port of a canister and a second purge line is connected between the ejection pipe of the ejector and a connecting pipe near an outlet of a throttle valve. A branch line is connected between the inlet pipe of the ejector and a predetermined position of an intake gas line. Additionally, a first booster is installed in the branch line to supercharge the intake gas to the inlet pipe of the ejector.

10 Claims, 4 Drawing Sheets

FUEL VAPOR GAS PURGE SYSTEM

CROSS-REFERENCE TO RELATED APPLICATION

This application claims under 35 U.S.C. § 119(a) the benefit of priority to Korean Patent Application No. 10-2018-0134098 filed on Nov. 5, 2018, the entire contents of which are incorporated herein by reference.

BACKGROUND

(a) Technical Field

The present disclosure relates to a fuel vapor gas purge system and, more particularly, to a fuel vapor gas purge system for purging vapor gas that evaporates in a fuel tank and is collected in a canister to an engine through a single purge line even at engine positive pressure, as well as at engine negative pressure.

(b) Background Art

Vapor gas is generated from fuel charged in a fuel tank of a vehicle based on an environment factor, such as surrounding temperature, and in this case, the vapor gas contains pernicious ingredients (e.g., HC, etc.) and, thus, when a vehicle discharges vapor gas, the vapor gas causes unnecessary fuel consumption, as well as air pollution. To overcome this, a canister is installed at a predetermined position in the fuel tank to collect vapor gas that evaporates in a fuel tank and then purging the collected vapor gas to an engine to be combustible using engine negative pressure.

Accordingly, vapor gas that is adsorbed to active carbon in the canister is purged to an engine to be combustible through a connecting pipe including a throttle control valve when engine negative pressure is applied. Accordingly, the vapor gas is prevented from being discharged to the outside and, simultaneously, unnecessary fuel consumption is prevented. The configuration and operation flow of the conventional vapor gas single purge system will be described below.

FIG. 1 is a systematical diagram showing the conventional vapor gas single purge system according to the related art, and a reference numeral 10 denotes a surge tank of an engine. A connecting pipe 11 is connected to a surge tank 10 of the engine, and an intake gas line 12 for supply toward a suction surge tank 10 is connected to the connecting pipe 11.

Additionally, an air cleaner 13 for filtering external impurities based on a direction in which intake gas flows towards a surge tank, a compressor 14 of a turbo charger for supercharging intake gas using exhaust gas, and an electronic throttle control valve (ETC) 15 are sequentially installed in the intake gas line 12. An intercooler 40 is disposed between the compressor 14 and the ETC 15 in the intake gas line 12. In particular, a canister 21 for collecting vapor gas is installed at a predetermined position of a fuel tank 20, a purge line 22 for purging vapor gas to an engine is connected between an outlet of the canister 21 and the intake gas line 12 near an outlet of the ETC 15, and a purge control solenoid valve (PCSV) 24 for purging or blocking vapor gas is installed in the purge line 22.

A first check valve CV through which vapor gas passes while engine negative pressure is applied is installed between the PCSV 24 and the intake gas line 12 near the outlet of the ETC 15 in the purge line 22. Accordingly, when the PCSV 24 is operated to be open based on a control signal from a controller (not shown) to purge vapor gas collected in the canister 21, the vapor gas collected in the canister 21 is suctioned by engine negative pressure, and simultaneously, is purged to the surge tank 10 along the purge line 22, and then, combusts in a combustion room of an engine.

However, when a surge tank side of an engine enters a positive pressure state, but not a negative pressure state, due to boost pressure that is supply pressure when intake gas is compressed and is supplied to the engine via an operation of a compressor of a turbo charger, vapor gas collected in the canister is not capable of being purged toward the surge tank. Accordingly, a vapor gas dual purge system for ejecting vapor gas collected in the canister to an intake gas line using an ejector that is a type of a jet pump even when pressure at a surge tank side of an engine is in a positive pressure state and purging the vapor ejected to the intake gas line toward the engine along with the intake gas has been applied.

However, with regard to the conventional vapor gas dual purge system, as described below with reference to FIG. 2 of the related art, when pressure at the surge tank side of the engine is in a positive pressure state, the intake gas line is used as a purge path for purging the vapor gas of the canister using an ejector. Accordingly, purge of vapor gas is delayed due to a too long vapor gas purge path, thereby reducing vapor gas purge efficiency.

SUMMARY

In one aspect, the present disclosure provides a fuel vapor gas purge system that purges vapor gas collected in a canister to an engine through a single purge line when engine negative pressure is applied and also purges the vapor gas collected in the canister to the engine through the single purge line even in an engine positive pressure state.

In an exemplary embodiment, a fuel vapor gas purge system may include an ejector having an inlet pipe for intake of intake gas, an ejection pipe for ejection of the intake gas and vapor gas, and a suction pipe for suctioning the vapor gas, a first purge line connected between the suction pipe of the ejector and a vapor gas outlet port of a canister, a second purge line connected between the ejection pipe of the ejector and a connecting pipe near an outlet side of a throttle valve, a branch line connected between the inlet pipe of the ejector and a predetermined position of an intake gas line, and a first booster installed in the branch line to supercharge the intake gas to the inlet pipe of the ejector.

In another exemplary embodiment, the branch line may be connected between the inlet pipe of the ejector and the intake gas line at a position of an outlet side of a compressor. The first booster may be employed as an electric blower. Additionally, the fuel vapor gas purge system may further include a second booster installed in an air side port of the canister to correct or adjust a pressure level at a side of the canister and a purge control solenoid valve (PCSV) to a standard atmospheric pressure level. The second booster may be employed as an electric blower operated when an atmospheric pressure sensor detects a signal that is less than the standard atmospheric pressure.

When engine negative pressure is applied toward the second purge line through the connecting pipe, vapor gas collected in the canister may be introduced into the suction pipe of the ejector from the first purge line by engine negative pressure, and simultaneously, may be purged to the second purge line through the ejection pipe of the ejector and then may be supplied to the engine. Additionally, when engine positive pressure is applied toward the second purge line through the connecting pipe, the first booster installed in the branch line may be operated to supercharge intake gas to the inlet pipe of the ejector.

In another exemplary embodiment, vapor gas collected in the canister may be suctioned to the suction pipe of the ejector, and simultaneously, may be purged to the second purge line through the ejection pipe of the ejector and may then be supplied to the engine due to a decrease in pressure at which the intake gas supercharged to the inlet pipe of the ejector passes through a Venturi passage of the ejector and is discharged through the ejection pipe. When an atmospheric pressure sensor detects a signal that is less than standard atmospheric pressure, the second booster installed in the air side port of the canister may be operated to suction and supply outside air to maintain the standard atmospheric pressure level toward the canister and the purge control solenoid valve (PCSV).

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not limitative of the present disclosure, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present disclosure, examples of which are illustrated in the accompanying drawings and described below.

First, to aid in the understanding of the present disclosure, the configuration and operation flow of a conventional vapor gas dual purge system will be described below. The conventional vapor gas dual purge system is configured in a two-way purge manner to separately include a vapor gas purge path in case of engine negative pressure and a vapor gas purge path in case of engine positive pressure.

Figure 1:
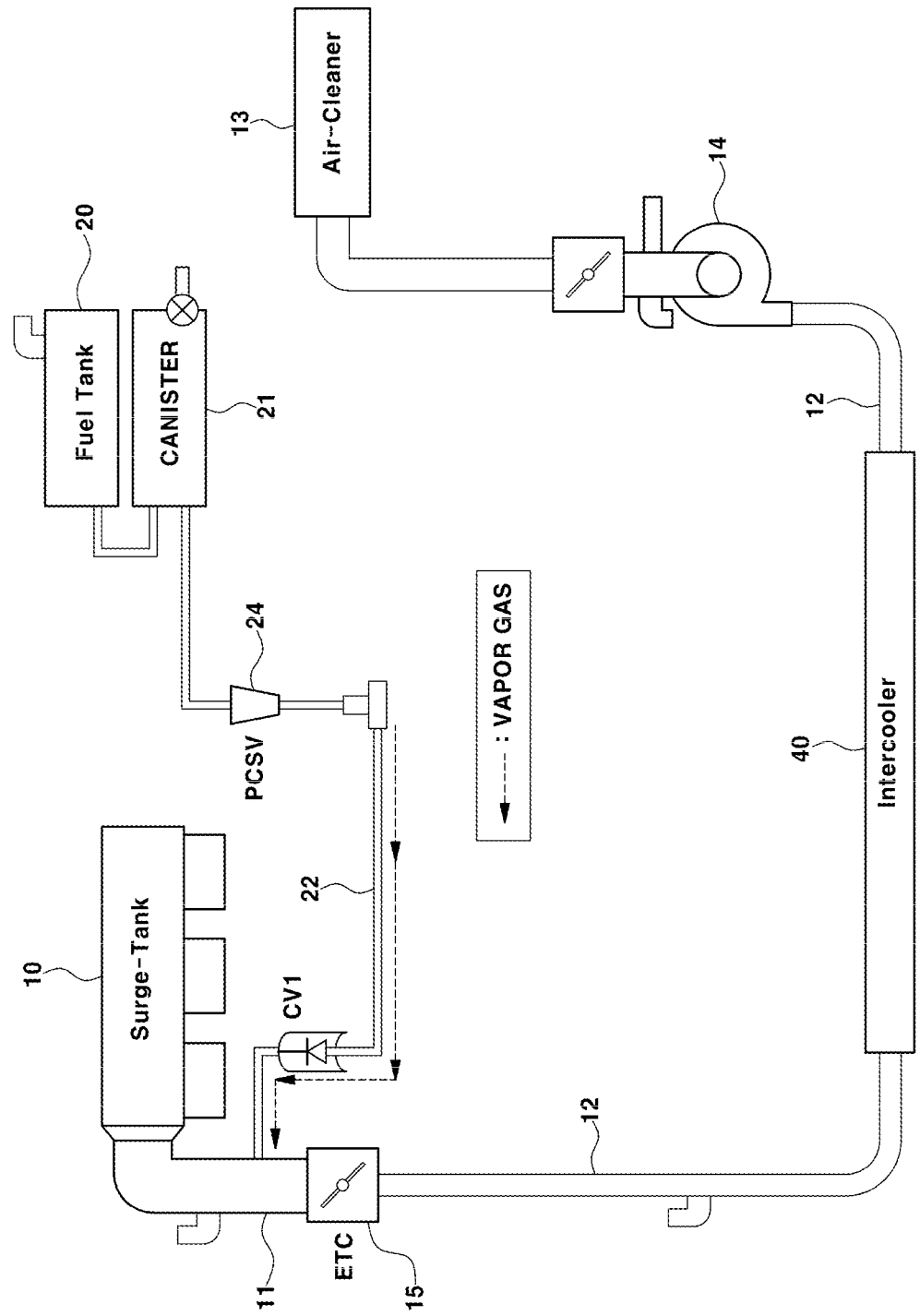
FIG. 1 is a systematical diagram showing a conventional vapor gas single purge system according to the related art.
Figure 2:
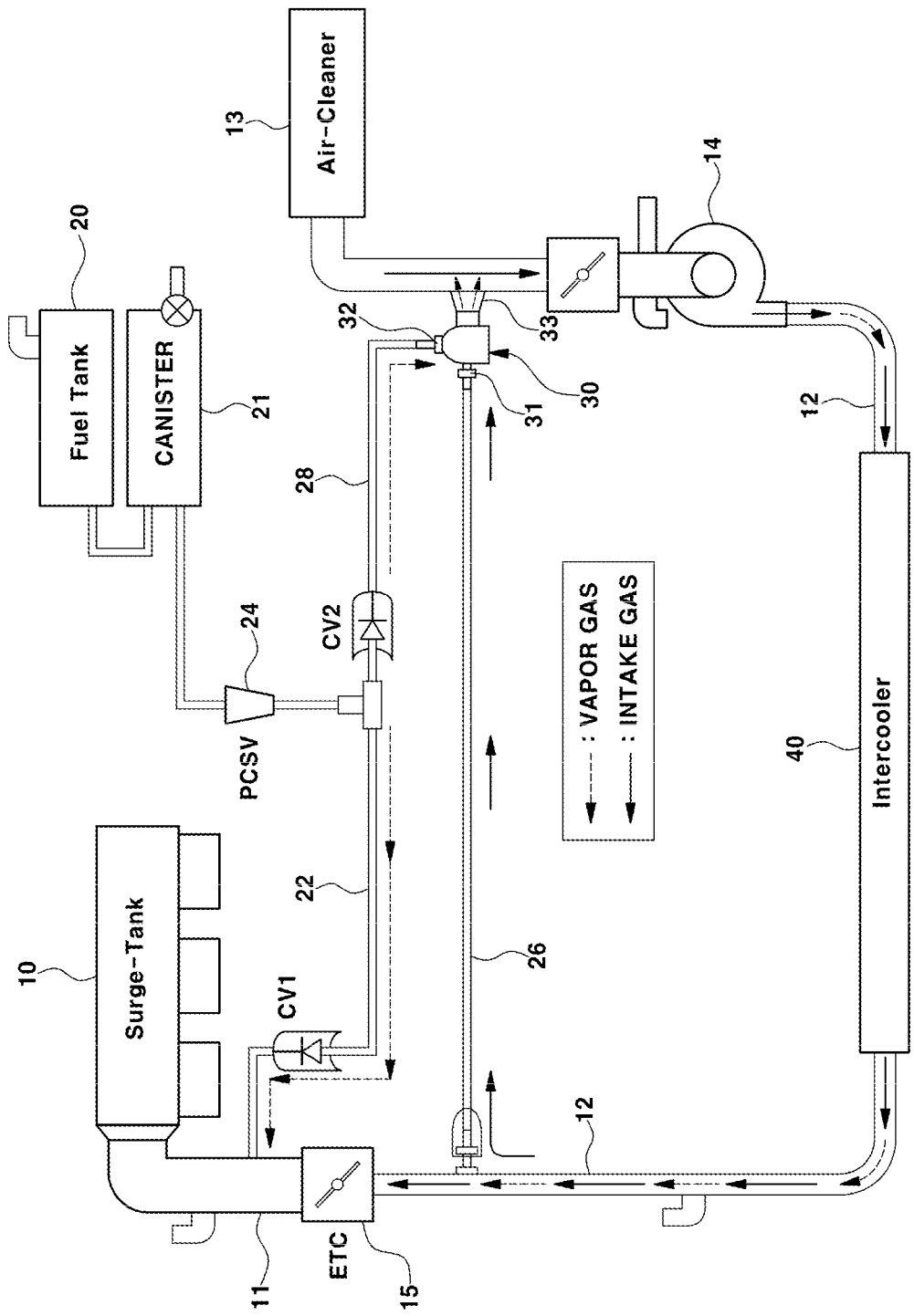
FIG. 2 is a systematical diagram showing a conventional vapor gas dual purge system according to the related art.

FIG. 2 is a systematical diagram showing the conventional vapor gas dual purge system according to the related art, and a reference numeral 10 denotes a surge tank of an engine. As described above, a connecting pipe 11 is connected to the surge tank 10 of the engine, an intake gas line 12 for supply toward the suction surge tank 10 is connected to the connecting pipe 11, and an air cleaner 13 for filtering external impurities based on a direction in which intake gas flows toward a surge tank, a compressor 14 of a turbo charger or a supercharger for supercharging intake gas using exhaust gas, and an electronic throttle control valve (ETC) 15 are sequentially installed in the intake gas line 12. An intercooler 40 is disposed between the compressor 14 and the ETC 15 in the intake gas line 12.

A canister 21 for collecting vapor gas is installed at a predetermined position of a fuel tank 20. A purge line 22 for purging vapor gas to an engine is connected between an outlet of the canister 21 and the connecting pipe 11. The purge line 22 is connected to the connecting pipe 11 near an outlet of the ETC 15. A purge control solenoid valve (PCSV) 24 for purging or blocking vapor gas is installed in the purge line 22. A first check valve CV1 through which vapor gas may pass while engine negative pressure is applied is installed in the purge line 22 connected between the PCSV 24 and the connecting pipe 11. In particular, an ejector 30 that is a type of a jet pump is installed at a position of the intake gas line 12, which corresponds to a portion between the air cleaner 13 and the compressor 14.

In particular, the ejector 30 may include an inlet pipe 31 for intake of intake gas, an ejection pipe 33 that uses a tube having an increasing diameter toward an exit of the tube for ejecting the intake gas into the intake gas line 12, and a suction pipe 32 for suctioning vapor gas, and may include a Venturi passage (not shown) formed in the ejector 30. An intake gas recirculation line 26 may be connected between the inlet pipe 31 of the ejector 30 and the intake gas line 12 at an inlet side of the ETC 15. An auxiliary line 28 branching from the purge line 22 may be connected between the purge line 22 and the suction pipe 32 of the ejector 30, and a second check valve CV2 may be installed in the auxiliary line 28. Accordingly, when engine negative pressure is generated from the surge tank 10 of an engine, the PCSV 24 may be opened based on a control signal from a controller (not shown), and vapor gas collected in the canister 21 may be suctioned by the engine negative pressure, and simultaneously, may be purged to the surge tank 10 along the purge line 22, and then, may combust in a combustion room of the engine.

When a surge tank side of an engine enters a positive pressure state, but not a negative pressure state, due to boost pressure at which intake gas is compressed and supplied to the engine via an operation of the compressor 14 of the turbo charger, the vapor gas collected in the canister may not be capable of being purged toward the surge tank, may be ejected or pushed to the intake gas line 12 through the ejector 30 and may be supplied to the engine along with intake gas. Accordingly, when the surge tank side of the engine enters a positive pressure state, but not a negative pressure state, the vapor gas collected in the canister 21 may pass through the PCSV 24, and then, may flow toward the suction pipe 32 of the ejector 30 along the auxiliary line 28.

A portion of the intake gas, which currently passes through the ETC 15 along the intake gas line 12, flows along the intake gas recirculation line 26 and is then introduced into the inlet pipe 31 of the ejector 30, and passes through a Venturi passage therein. At this moment, flow velocity of intake gas may be increased, and simultaneously, pressure thereof may be reduced, and continuously, the intake gas passing through the Venturi passage may be ejected or pushed into the intake gas line 12 at an inlet of the compressor 14 while being diffused through the ejection pipe 33 that uses the tube having an increasing diameter toward the exit of the tube.

Particularly, as intake gas pressure at which intake gas passes through the Venturi passage via the inlet pipe 31 of the ejector 30 is decreased, vapor gas that flows toward the suction pipe 32 of the ejector 30 from the auxiliary line 28 may be instantaneously suctioned toward the Venturi passage. Thus, the vapor gas along with the intake gas may be purged into the intake gas line 12 at an inlet side of the compressor 14 through the ejection pipe 33 that uses the tube. Then the vapor gas purged into the intake gas line 12 at the inlet side of the compressor 14 may pass through the compressor 14 along with the intake gas, may be moved along the intake gas line 12 and, then, may pass through the ETC 15 to be supplied to the surge tank 10 of the engine to be combustible.

However, in the above conventional vapor gas dual purge system, the intake gas line 12 is used as a purge path for purging the vapor gas, which is collected in the canister 21 when pressure at the surge tank side of the engine is in a positive pressure state, to the surge tank 10 using the ejector 30, and density of vapor gas (purge gas) is decreased due to diffusion of the vapor gas and a time until the vapor gas reaches an inner side of the surge tank is delayed. Accordingly, purge of vapor gas is delayed due to an excessively long vapor gas purge path, thereby reducing vapor gas purge efficiency.

Accordingly, unlike the conventional vapor gas dual purge system, the present disclosure provides a one-way purge method of unifying the vapor gas purge path, and even when the one-way purge method is employed, vapor gas may be purged toward the engine through one short purge path in both engine negative pressure and engine positive pressure.

Figure 3:
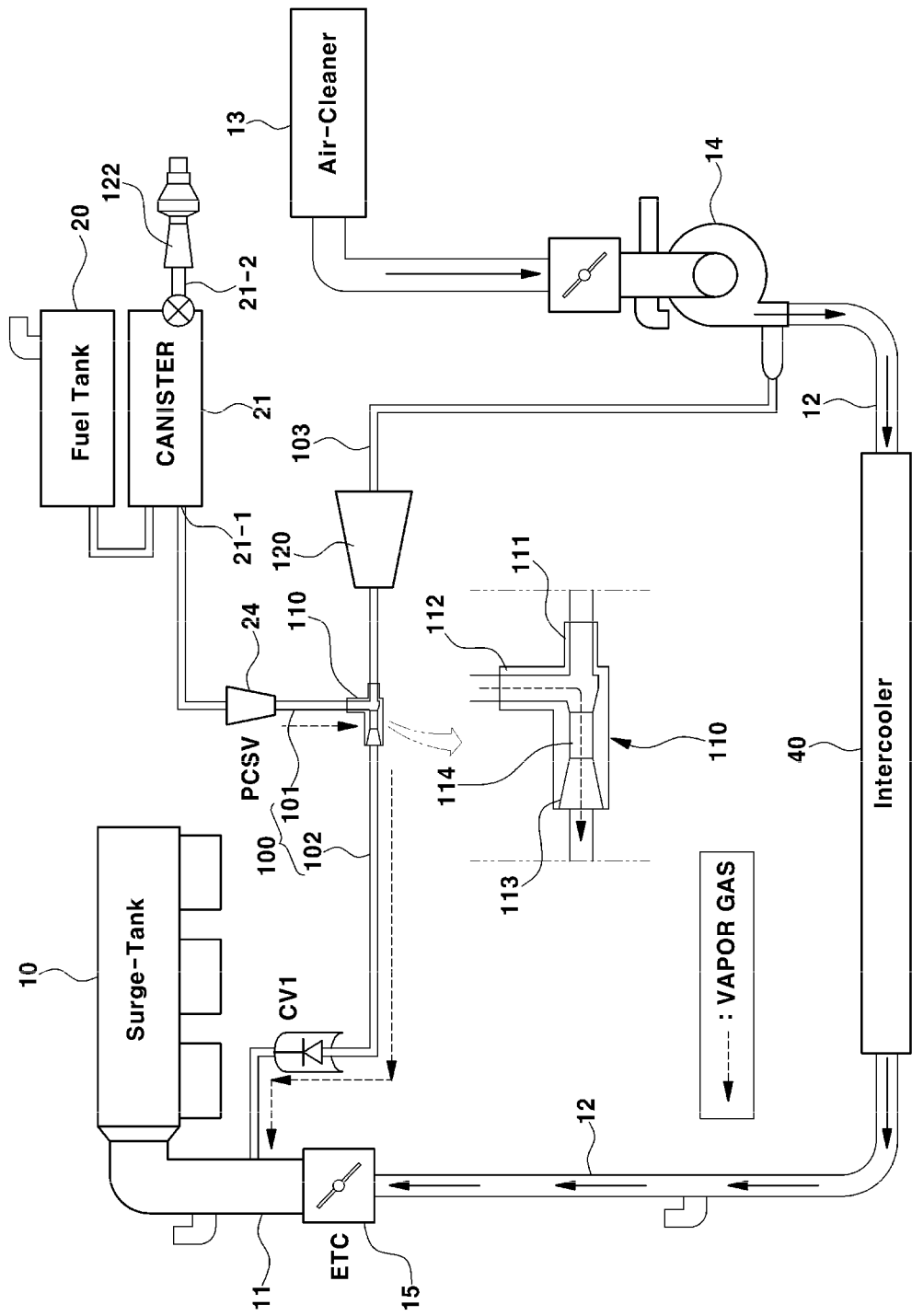
FIG. 3 is a systematical diagram showing the configuration of a fuel vapor gas purge system and an operation flow when engine negative pressure is applied according to an exemplary embodiment of the present disclosure.
Figure 4:
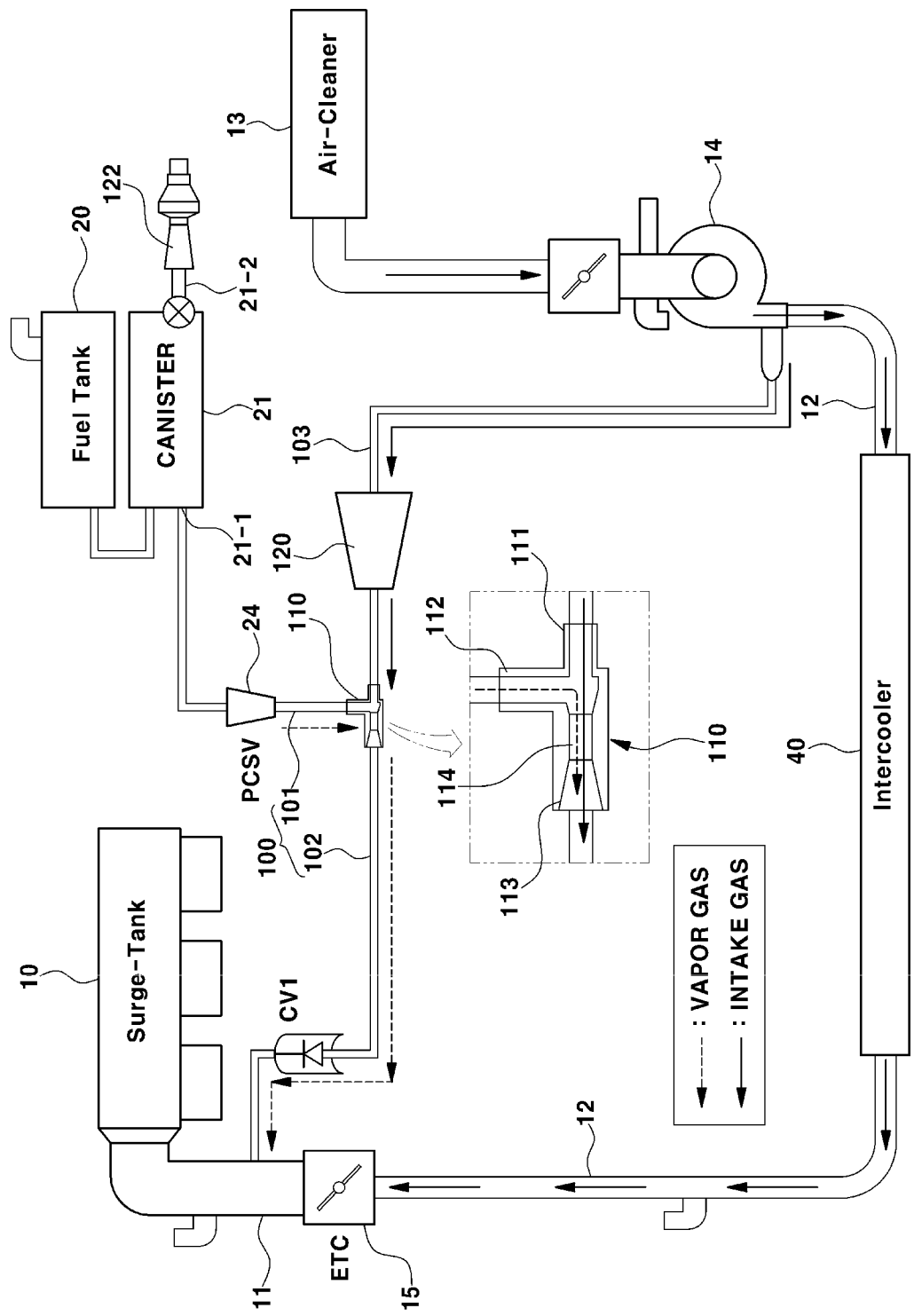
FIG. 4 is a systematical diagram showing the configuration of a fuel vapor gas purge system and an operation flow when engine positive pressure is applied according to an exemplary embodiment the present disclosure.

FIGS. 3 and 4 are systematical diagrams showing a fuel vapor gas purge system according to an exemplary embodiment the present disclosure. In particular, as shown, a first purge line 101 for discharging vapor gas may be connected to a vapor gas outlet port 21-1 of the canister 21. A second purge line 102 may be connected to the connecting pipe 11 near an outlet of the ETC 15. The first purge line 101 and the second purge line 102 may be coupled to each other to be connectable across an ejector 110 therebetween and may configure a single purge line 100 that functions as one vapor gas purge path.

In particular, the ejector 110 may be configured to eject vapor gas to the second purge line 102. Accordingly, an inlet pipe 111 for intake of intake gas may be formed at a first side portion of the ejector 110, an ejection pipe 113 for ejection of intake gas and vapor gas may be formed at a second side portion of the ejector 110, and a suction pipe 112 for suction of vapor gas may be formed at an upper side of the ejector 110.

Additionally, a Venturi passage 114 may be formed on a straight path directed toward the ejection pipe 113 from the inlet pipe 111 inside the ejector 110, and the suction pipe 112 may be disposed to penetrate in a perpendicular direction at an inlet side of the Venturi passage 114. Accordingly, the first purge line 101 may be connected between the vapor gas outlet port 21-1 of the canister 21 and the suction pipe 112 of the ejector 110, and the second purge line 102 may be connected between the connecting pipe 11 near the outlet end of the ETC 15 and the ejection pipe 113 of the ejector 110.

Further, a branch line 103 may be connected between the inlet pipe 111 of the ejector 110 and a predetermined position of the intake gas line 12 to allow intake gas to be introduced into the inlet pipe 111 of the ejector 110. In particular, as intake gas is supercharged via an operation of the compressor 14 of the turbo charger, pressure of intake gas at an outlet side of the compressor 14 becomes the highest in the entire intake gas line 12. Accordingly, the branch line 103 may be connected between the inlet pipe 111 of the ejector 110 and the intake gas line 12 at the outlet side of the compressor 14 of the turbo charger to supply the intake gas to the inlet pipe 111 of the ejector 110.

A first booster 120 for supercharging intake gas to the inlet pipe 111 of the ejector 110 may be installed in the branch line 103, and the first booster 120 may be a supercharger configured to supercharge intake gas and may be employed as an electric blower or as any device for supercharging intake gas. The first booster 120 may be disposed in the branch line 103 since it may be difficult to suction vapor gas to the suction pipe 112 of the ejector 110 using only intake gas supplied from the intake gas line 12 at the outlet side of the compressor 14 in an engine positive pressure state or an engine negative pressure state.

In other words, the first booster 120 may be installed in the branch line 103 to more easily suction vapor gas discharged from the canister 21 to the suction pipe 112 of the ejector 110 to be purged toward the surge tank through the ejection pipe 113 of the ejector 110 by compressing intake gas supplied from the intake gas line 12 at the outlet side of the compressor 14 toward the inlet pipe 111 of the ejector 110 in an engine positive pressure state or an engine negative pressure state. When the canister 21 collects vapor gas evaporated from fuel in the fuel tank 20, the vapor gas may be collected using active carbon, etc., and simultaneously, the remaining gas included in the vapor gas may be discharged to the outside through an air side port 21-2.

According to an exemplary embodiment of the present disclosure, a second booster 122 for correcting or adjusting a pressure level at the canister 21 and the PCSV 24 to a standard atmospheric pressure level may be further installed in the air side port 21-2 of the canister 21, and the second booster 122 may also be a type of a supercharger and employed as an electric blower. Particularly, since pulse width modulation (PWM) control for opening and closing of the PCSV 24 is mapped based on a standard atmospheric pressure state, atmospheric pressure is changed as altitude is increased while a vehicle is driven, and control for opening and closing of the PCSV 24 may not be performed smoothly. Therefore, the second booster 122 for correcting a pressure level at the canister 21 and the PCSV 24 to the standard atmospheric pressure may be further installed in the air side port 21-2 of the canister 21.

Accordingly, when an atmospheric pressure sensor detects a signal that is less than the standard atmospheric pressure, the second booster 122 may be operated to suction and supply outside air for maintaining the standard atmospheric pressure level toward the canister 21 and the PCSV 24, and accordingly, a side of the PCSV 24 may be corrected and maintained in the standard atmospheric pressure state. The operation flow of the fuel vapor gas purge system according to the present disclosure with the above configuration will be described.

Purge Flow of Vapor Gas in Engine Negative Pressure State

FIG. 3 shows the operation flow in case of engine negative pressure of the fuel vapor gas purge system according to an exemplary embodiment of the present disclosure. Engine negative pressure may be applied toward the second purge line 102 through the connecting pipe 11 and may also be applied to the first purge line 101 through the ejector 110.

Accordingly, vapor gas collected in the canister may be suctioned to the suction pipe 112 of the ejector 110 through the first purge line 101 by engine negative pressure, and may then be purged to the second purge line 102 through the ejection pipe 113 of the ejector 110. The vapor gas may be continuously purged to the second purge line 102 and pass through the connecting pipe 11 and the surge tank 10 and then may combust in a combustion engine of an engine.

In particular, when the second booster 122 installed in the air side port 21-2 of the canister 21 is operated, the vapor gas collected in the canister 21 may be compressed toward the suction pipe 112 of the ejector 110. Thus, the vapor gas may be purged more rapidly to the second purge line 102 through the ejection pipe 113 of the ejector 110, and may then be supplied to the combustion room of the engine through the connecting pipe 11 and the surge tank 10.

Purge Flow of Vapor Gas in Engine Positive Pressure State

FIG. 4 shows the operation flow in case of engine positive pressure of the fuel vapor gas purge system according to an exemplary embodiment of the present disclosure. Due to boost pressure at which intake gas is compressed and supplied to the engine via an operation of the compressor 14 of the turbo charger, a surge tank side of the engine may enter a positive pressure state, but not a negative pressure state.

Accordingly, when engine positive pressure is applied toward the second purge line 102 through the connecting pipe 11, the first booster 120 installed in the branch line 103 may be operated to supercharge intake gas to the inlet pipe 111 of the ejector 110. In other words, via the operation of the first booster 120, intake gas supplied from the intake gas line 12 at the outlet side of the compressor 14 may be compressed toward the inlet pipe 111 of the ejector 110 and may be supplied.

When the intake gas supercharged to the inlet pipe 111 of the ejector 110 passes through the Venturi passage 114 of the ejector 110, flow velocity of intake gas may be increased. Simultaneously, pressure thereof may be reduced, and the intake gas passing through the Venturi passage 114 may be continuously ejected (e.g., emitted, pushed, or the like) to the second purge line 102 while being diffused through the ejection pipe 113 that uses the tube having an increasing diameter toward the exit of the tube.

In particular, as intake gas pressure at which intake gas passes through the Venturi passage 114 via the inlet pipe 111 of the ejector 110 is decreased, vapor gas may be instantaneously suctioned toward the Venturi passage 114 through the suction pipe 32 of the ejector 30. Thus, the vapor gas along with the intake gas may be purged more easily to the second purge line 102 through the ejection pipe 113 that uses the tube having an increasing diameter toward the exit of the tube and may then be supplied to a combustion room of an engine through the connecting pipe 11 and the surge tank 10.

Accordingly, vapor gas may be purged more easily toward the engine via the operation of the first booster 120 even in an engine positive pressure state. When an atmospheric pressure sensor detects a signal that is less than the standard atmospheric pressure, the second booster 122 may be operated to suction and supply outside air for maintaining the standard atmospheric pressure level toward the canister 21 and the PCSV 24. Thus, a side of the PCSV 24 may be corrected and maintained in the standard atmospheric pressure state, and accordingly, the PCSV 24 may be operated to more smoothly supply vapor gas toward the suction pipe 32 of the ejector 30.

Trough the above configuration, the present disclosure may have the following effects.

First, vapor gas collected in a canister may be purged to an engine through a single purge line when engine negative pressure is applied, and may also be purged more easily through the same single purge line even in an engine positive pressure state.

Second, vapor gas may be purged to the engine through the same purge line in the case of engine negative pressure or engine positive pressure, and thus, a vapor gas purge path in case of the engine positive pressure may be reduced compared with the conventional case, thereby enhancing vapor gas purge efficiency.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A fuel vapor gas purge system, comprising:
an ejector including an inlet pipe for intake of intake gas, an ejection pipe for ejection of the intake gas and vapor gas, and a suction pipe for suctioning the vapor gas;
a first purge line connected between the suction pipe of the ejector and a vapor gas outlet port of a canister;
a second purge line connected between the ejection pipe of the ejector and a connecting pipe connected to an outlet side of a throttle valve;
a branch line connected between the inlet pipe of the ejector and a predetermined position of an intake gas line; and
a first booster installed in the branch line to supercharge the intake gas to the inlet pipe of the ejector.

2. The fuel vapor gas purge system of claim 1, wherein the branch line is connected between the inlet pipe of the ejector and the intake gas line at a position of an outlet side of a compressor.

3. The fuel vapor gas purge system of claim 1, wherein the first booster is employed as an electric blower.

4. The fuel vapor gas purge system of claim 1, further comprising:

a second booster installed in an air side port of the canister to adjust a pressure level at a side of the canister and a purge control solenoid valve (PCSV) to a standard atmospheric pressure level.

5. The fuel vapor gas purge system of claim 4, wherein the second booster is employed as an electric blower that is operated when an atmospheric pressure sensor detects a signal that is less than the standard atmospheric pressure.

6. The fuel vapor gas purge system of claim 1, wherein, when engine negative pressure is applied toward the second purge line through the connection pipe, vapor gas collected in the canister is introduced into the suction pipe of the ejector from the first purge line by engine negative pressure, and simultaneously, is purged to the second purge line through the ejection pipe of the ejector then is supplied to the engine.

7. The fuel vapor gas purge system of claim 1, wherein, when engine positive pressure is applied toward the second purge line through the connecting pipe, the first booster installed in the branch line is operated to supercharge intake gas to the inlet pipe of the ejector.

8. The fuel vapor gas purge system of claim 7, wherein vapor gas collected in the canister is suctioned to the suction pipe of the ejector, and simultaneously, is purged to the second purge line through the ejection pipe of the ejector and then is supplied to the engine due to a decrease in pressure at which the intake gas supercharged to the inlet pipe of the ejector passes through a Venturi passage of the ejector and is discharged through the ejection pipe.

9. The fuel vapor gas purge system of claim 4, wherein, when an atmospheric pressure sensor detects a signal that is less than standard atmospheric pressure, the second booster installed in the air side port of the canister is operated to suction and supply outside air for maintaining the standard atmospheric pressure level toward the canister and the purge control solenoid valve (PCSV).

10. A vehicle comprising the fuel vapor gas purge system of claim 1.

* * * * *